Nov. 12, 1963     W. E. GENUNG ETAL     3,110,756
COAXIAL CABLE CONNECTOR
Filed Nov. 22, 1960
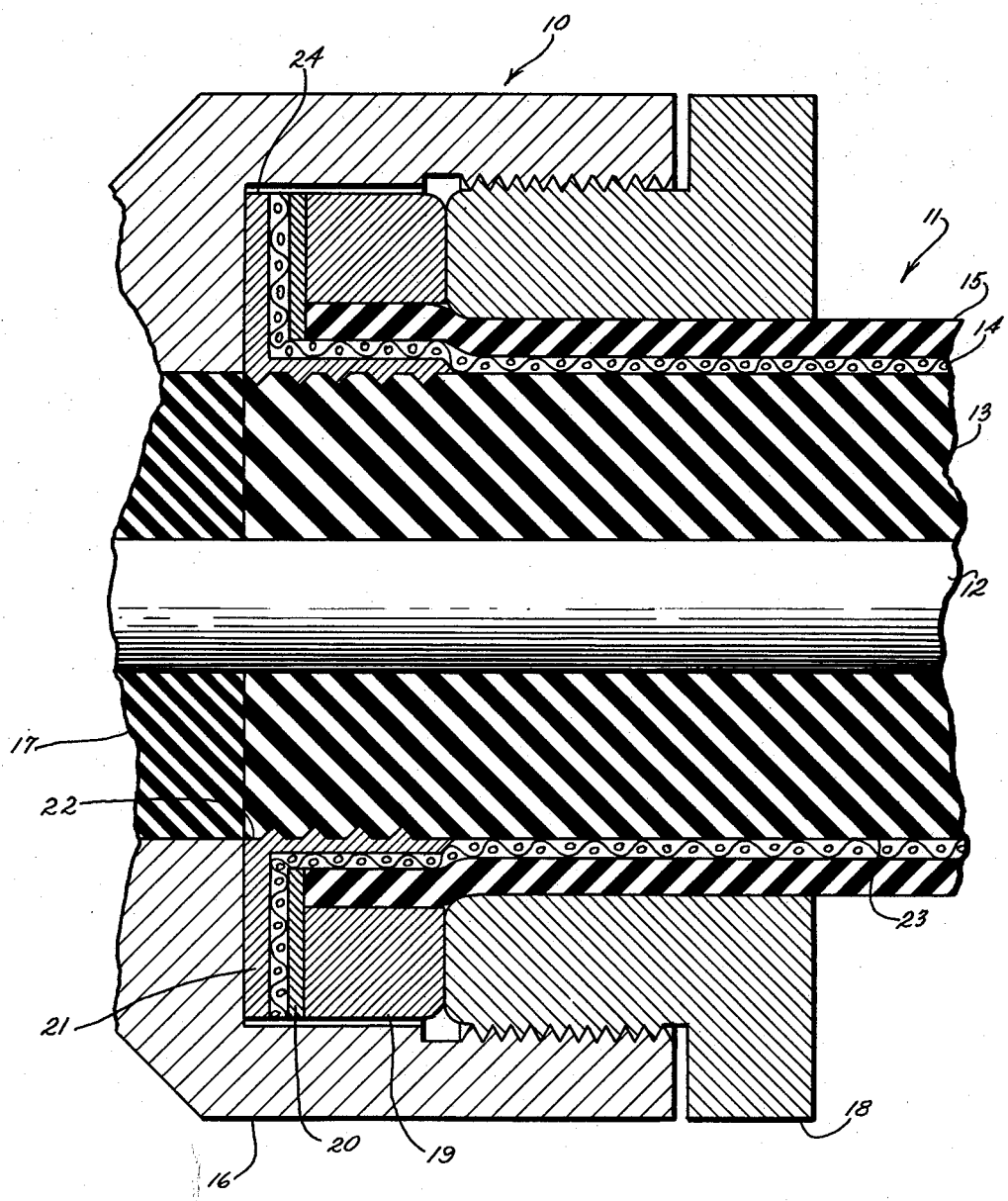
Inventor
WILLIAM E. GENUNG
CHARLES M. CHULICK
By Hill, Sherman, Meroni, Gross & Simpson Attys.

United States Patent Office 3,110,756
Patented Nov. 12, 1963

3,110,756
COAXIAL CABLE CONNECTOR
William E. Genung, Wickliffe, and Charles M. Chulick, Warrensville Heights, Ohio, assignors to Thompson Ramo Wooldridge Inc., Cleveland, Ohio, a corporation of Ohio
Filed Nov. 22, 1960, Ser. No. 71,057
1 Claim. (Cl. 174—89)

This invention relates to connectors and, more particularly, to a ferrule for a radio frequency coaxial cable connector.

The standard method of coupling a coaxial cable to a connector has been to clamp the cable braid to the connector body with a clamp ring and clamp nut. This type of a connector has frequently been the cause of a failure because the cable braid tends to stretch during service, with the result that the face of the cable core dielectric does not meet the face of the dielectric in the connector. The resulting air gap between these two faces has caused a corona effect at relatively low voltages which in turn has caused a rapid breakdown of the cable at this junction.

Accordingly, it is an object of this invention to eliminate this difficulty by providing a ferrule for a coaxial cable connector that is adapted to be attached to the cable core dielectric.

When a ferrule that is constructed in accordance with the invention is attached to the cable core dielectric and properly clamped against the connector by the clamp ring and clamp nut, the cable core dielectric is drawn tightly against the connector dielectric and the chance of a failure due to corona effect is greatly reduced.

Other objects, features and advantages of the present invention will be apparent from the following detailed description taken in conjunction with the accompanying single FIGURE of the drawing which is a view in a cross section of a connector having a ferrule constructed in accordance with the invention.

As shown on the drawings:

The reference numeral 10 indicates generally a connector that is adapted to be coupled to a coaxial cable 11 that includes an inner conductor 12, a solid dielectric cable core 13, a cable braid 14, and a protective cable cover 15.

The connector 10 includes a body 16 that is secured to a solid dielectric 17 by suitable means (not shown), a clamp ring 19, a nut 18, a washer 20 and a ferrule 21. The inner surface 22 of the ferrule 21 is adapted to be secured to the outer surface of the dielectric cable core 13. When the cable core is made of Teflon or polyethylene, it is preferred that the means for securing the ferrule to the cable core be a 60° V-thread that is formed on the inner surface of the ferrule 21. However, any method that will secure the ferrule to the dielectric and provide a reasonable gripping action is satisfactory.

When the coaxial cable 11 is to be coupled to the connector 10, the clamp ring 19, the nut 18, and the washer 20 are first slipped over the end of the coaxial cable 11, and the ferrule 21 is then threaded on the outer surface of the cable core 13 underneath the cable braid 14. The end of the cable braid 14 is then positioned between an outwardly extending flange 24 formed on the ferrule 21 and the washer 20. After the end of the cable cover 15 is positioned against the washer 20, the clamp ring 19 is fixed in place over the top of the cover and up against the washer 20, and the clamp nut 18 is screwed into the connector body 16. This threading action forces the ferrule 21 tightly against the connector body 16. Since the ferrule 21 is fixed to the cable core 13 and to the cable braid 14, the face of the cable core 13 is pressed tightly against the face of the dielectric 17 in the connector. It can be seen that good contact will always be made between the two dielectrics and failures due to corona effect will be greatly reduced.

It will be apparent that many modifications and variations may be effected without departing from the scope of the novel concepts of the present invention.

We claim as our invention:

A connection between a connector and a coaxial cable wherein said coaxial cable has an inner conductor, a dielectric cable core surrounding the conductor, and a cable braid surrounding the dielectric core; and said connector has a connector body, a connector dielectric within said connector body having a face contacting the dielectric cable core, comprising:

a ferrule having an outwardly extending flange formed thereon and threads formed on the inner surface thereof, said ferrule being threaded on the cable core between said core and said cable braid, said cable braid having a portion thereof extending outwardly and contacting one face of the ferrule flange, said ferrule flange having its other face in contact with the connector body, and releasable coupling means releasably connected to the connector body to urge the cable braid in contact with the ferrule flange face and other ferrule flange face in contact with the connector body whereby the dielectric cable core is maintained in contact with the connector dielectric to substantially eliminate corona effect from an air gap between the dielectric cable core and the connector dielectric.

References Cited in the file of this patent
UNITED STATES PATENTS

| | | |
|---|---|---|
| 2,862,994 | Yeiser | Dec. 2, 1958 |
| 2,914,740 | Blonder | Nov. 24, 1959 |

FOREIGN PATENTS

| | | |
|---|---|---|
| 499,407 | Great Britain | Jan. 23, 1939 |